Feb. 11, 1969 C. R. LYONS 3,426,516
ASPARAGUS HARVESTER
Filed March 21, 1966 Sheet 1 of 5
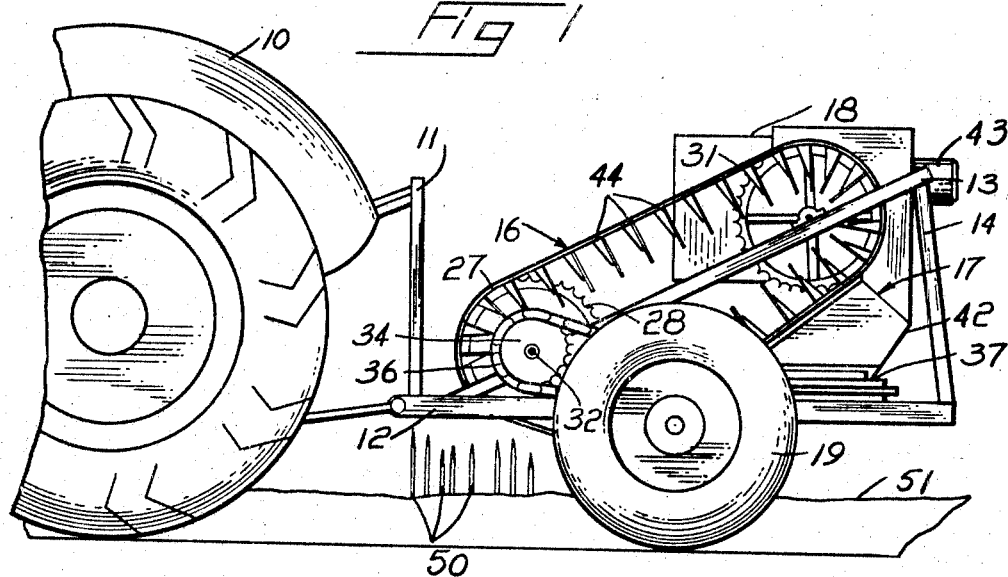
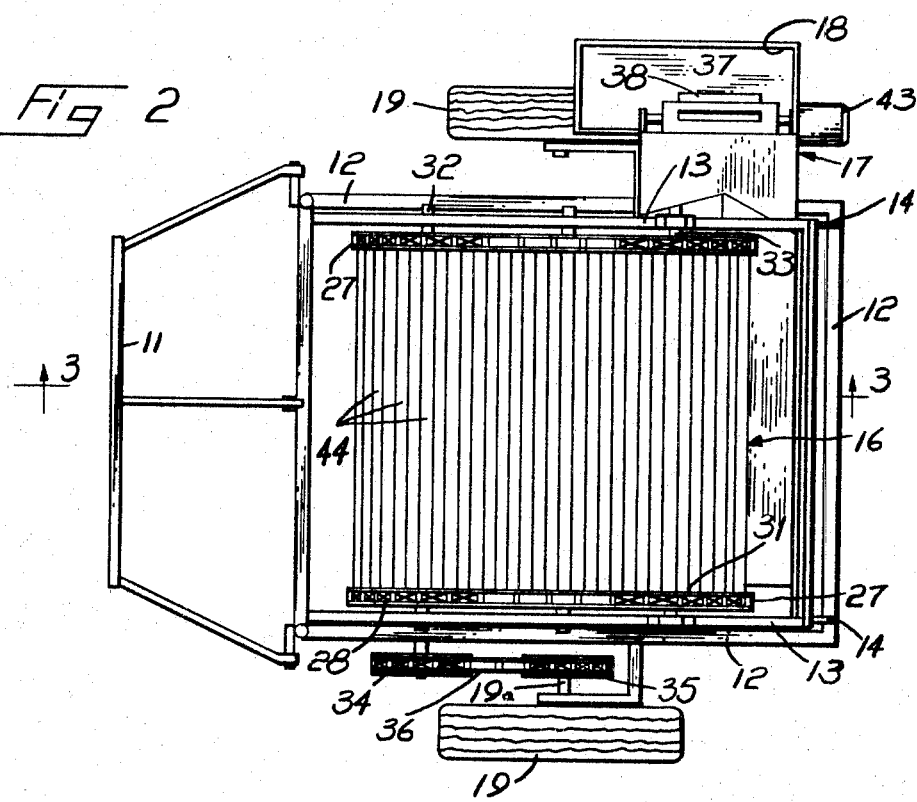
INVENTOR
CHARLES R. LYONS
BY
ATTYS.

INVENTOR
CHARLES R. LYONS
BY Wells & St.John
ATTYS.

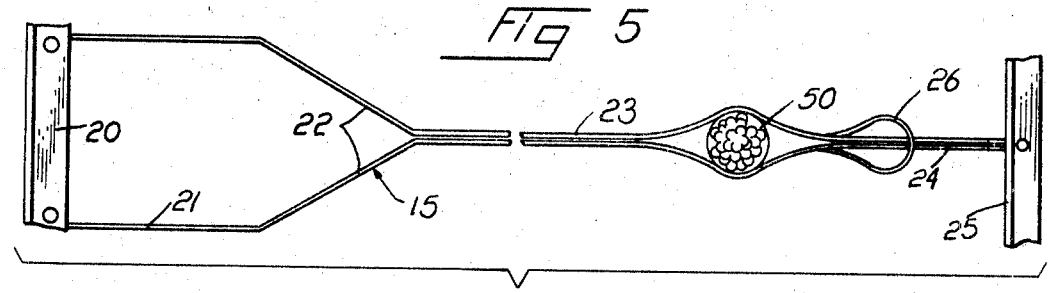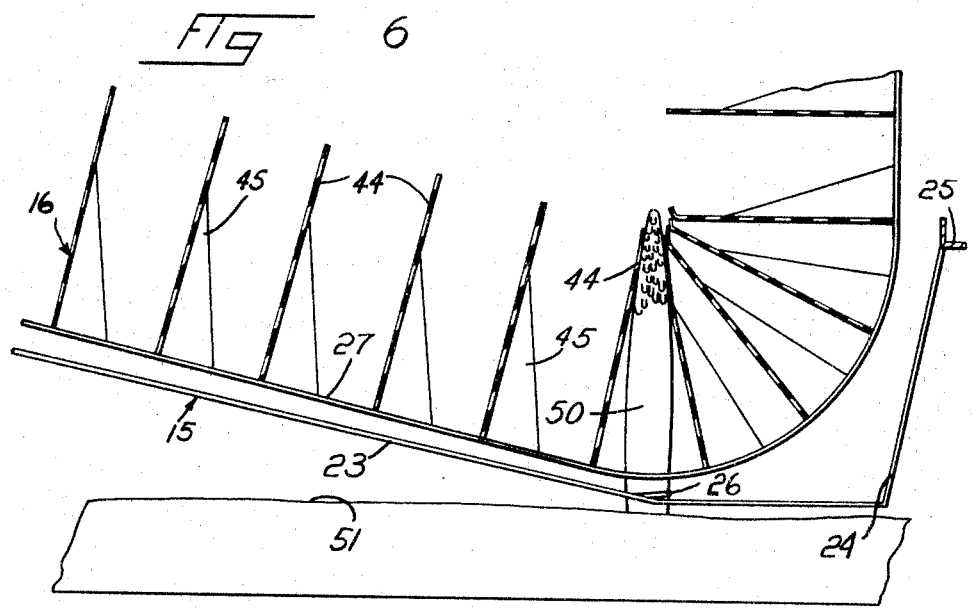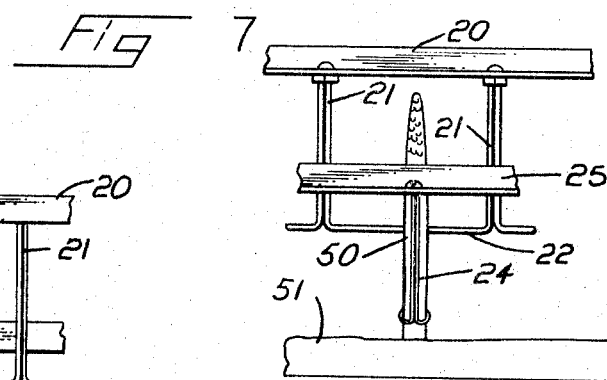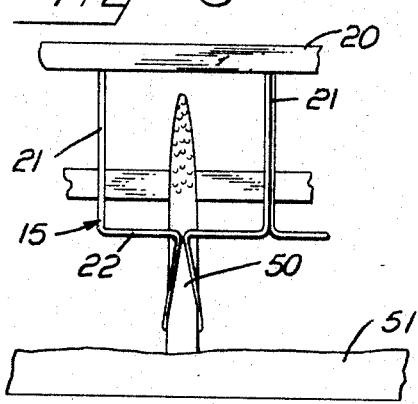
INVENTOR
CHARLES R. LYONS
BY
ATTYS.

Feb. 11, 1969  C. R. LYONS  3,426,516
ASPARAGUS HARVESTER
Filed March 21, 1966  Sheet 4 of 5

INVENTOR
CHARLES R. LYONS
BY
ATTYS.

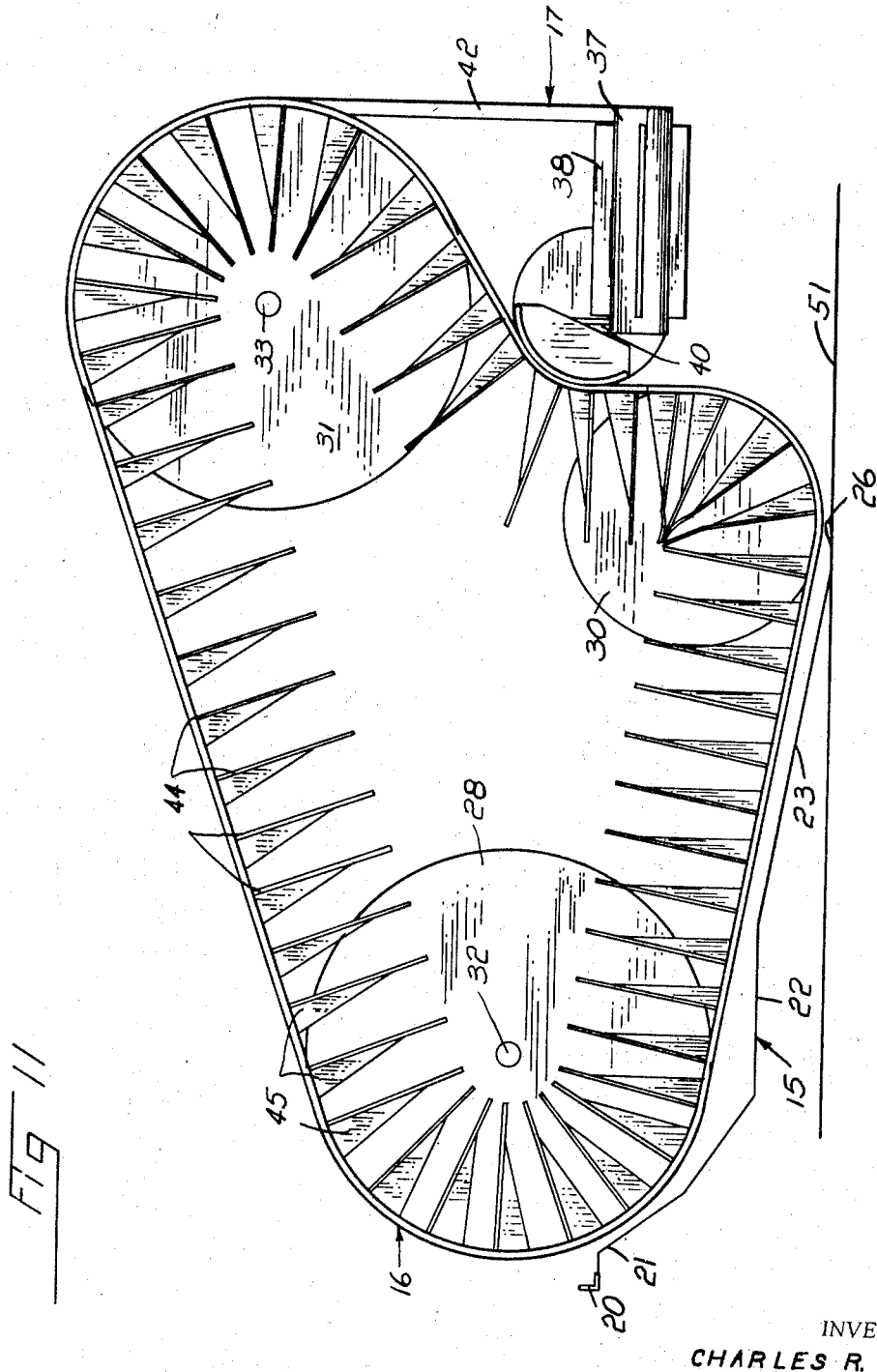

United States Patent Office 3,426,516
Patented Feb. 11, 1969

3,426,516
ASPARAGUS HARVESTER
Charles R. Lyons, c/o Lyons Engineering & Development,
Rte. 2, Box 119–b, Zillah, Wash. 98953
Filed Mar. 21, 1966, Ser. No. 536,040
U.S. Cl. 56—327
Int. Cl. A01d 45/10
9 Claims

ABSTRACT OF THE DISCLOSURE

An asparagus harvester mounted on a mobile framework. The harvester includes wire guides having converging horizontal sections which engage asparagus spears having at least a selected minimum height. Each guide element leads downwardly to ground level, and carries a cutting knife at its rear end. A spear conveyor moves across the guides and grips each spear simultaneously with the cutting thereof. The spears are carried by flexibile paddles to a receiving bin.

---

This invention relates to an asparagus harvester.

The present invention is concerned with the harvesting of asparagus, automatically selecting spears having at least a minimum length. It protects the fragile upper tip portion of each spear, which must be handled without damage.

The apparatus described below provides a flexible guide for locating and selecting asparagus spears for harvesting, rejecting those spears not of a minimum height. Each spear to be harvested is cut adjacent to the ground surface and immediately gripped by yieldable moving elements to prevent unwanted movement of the spear and consequent damage to its fragile tip.

An object of the invention is to provide a simple guiding and cutting mechanism for asparagus, having essentially no moving parts in the apparatus that initially contacts the spear.

Another object of this invention is to provide a unique grasping apparatus for holding the individual spears as they are being harvested, each spear initially being yieldably held in its original position with no relative motion between the grasping devices and the stationary spear.

These and further objects will be evident from the following disclosure, taken together with the accompanying drawings, the drawings illustrating a preferred form of the invention and one modification thereof. It is to be understood that the precise structure shown in the drawings is not intended to limit the scope of my invention, as it is claimed at the conclusion of the description.

In the drawings:

FIGURE 1 is a side elevation view of a typical harvester, further illustrating the attachment of the harvester at the rear end of the conventional tractor;

FIGURE 2 is a top view of the harvester;

FIGURE 5 is a fragmentary top view of the wire guide and cutting apparatus showing an asparagus spear prior to the cutting thereof;

FIGURE 6 is an enlarged side elevation view of the apparatus shown in FIGURE 5 together with a somewhat schematic view illustrating the relative positions of the spear grasping paddles;

FIGURE 7 is a front view of the apparatus shown in FIGURE 5;

FIGURE 8 is a rear view of the apparatus shown in FIGURE 5;

FIGURE 11 is a schematic view of the involved apparatus, including a slight modification in the spear guide.

Figure 3:
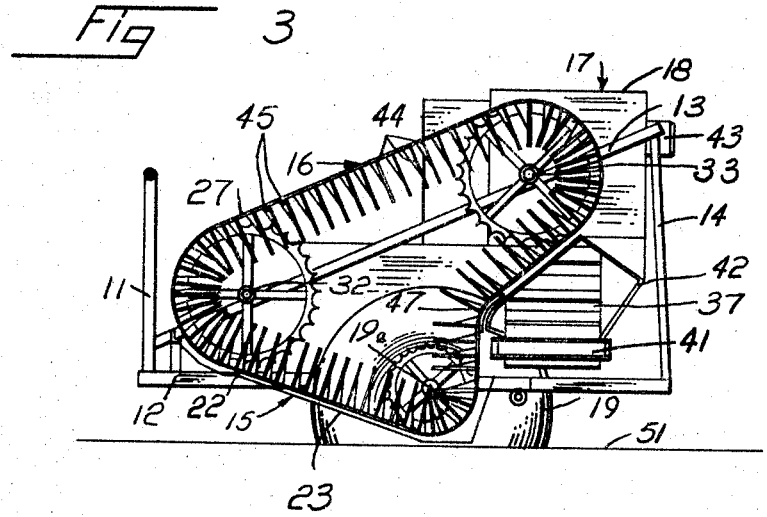
FIGURE 3 is a vertical sectional view of the harvester taken along line 3—3 in FIGURE 2.

Referring now to the drawings, and particularly to FIGURE 1, the harvester is shown being towed in a forward direction (to the left) behind a conventional tractor 10. The harvester is supported at the rear of tractor 10 by a conventional three point hitch 11, permitting the entire harvester to be raised or lowered relative to the frame of tractor 10. The harvester itself is supported by two side wheels 19 on opposite wheel axles 19a. The frame of the harvester includes a substantially horizontal frame section 12 that carries a rearwardly and upwardly protruding frame section 13. Two rear uprights 14 partially support the upper end of the diagonal frame section 13.

Figure 4:
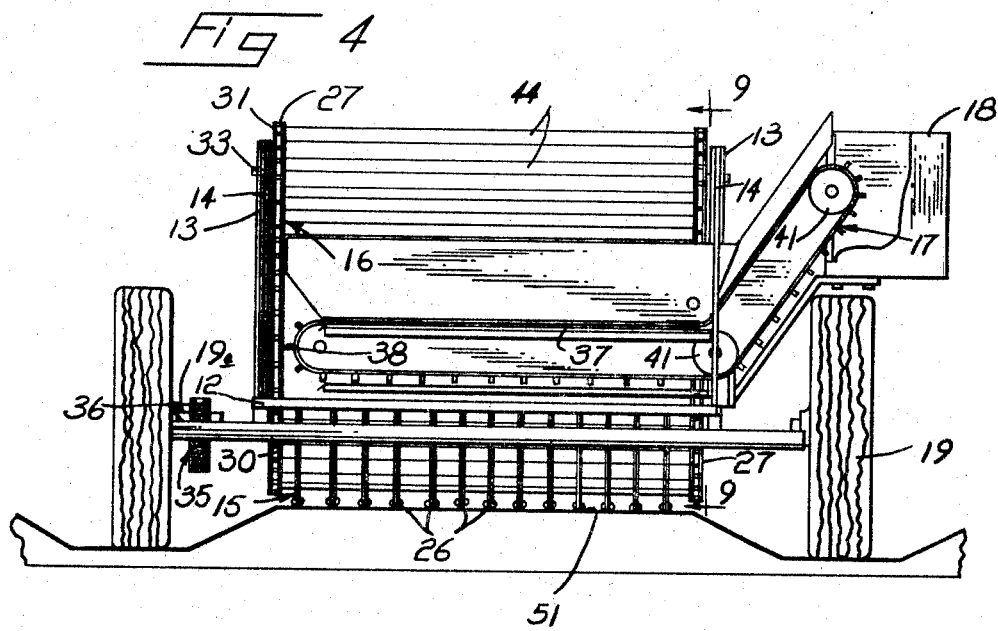
FIGURE 4 is a rear view of the harvester at a slightly increased scale.

The harvester includes four basic operational mechanisms, each being interrelated to the other so as to properly handle the asparagus crop. The first of these is a crop guiding and cutting apparatus (generally designated by the numeral 15) located across the harvester directly beneath the horizontal frame secton 12. Immediately above the crop guiding and cutting apparatus 15 is a crop engaging and supporting conveyor assembly 16, which constitutes an endless chain at each side of the harvester and a series of transverse paddles supported thereby. At the rear of the harvester is a delivery conveyor assembly 17 to which harvested spears are directed by the conveyor assembly 16. Finally a storage compartment 18 is provided at the delivery end of the conveyor 17 (FIGURES 2, 4).

Taking first, the crop guiding and cutting apparatus, this can best be understood from the detailed disclosure illustrated in FIGURES 5 through 8. The guiding and cutting apparatus 15 actually comprises a series of identical devices spaced transversely across the horizontal frame section 12 and protruding longitudinally rearward relative to the desired direction of movement of the harvester. While only a single guiding and cutting device is shown in FIGURES 5 through 8, it is to be understood that these devices are closely adjacent to one another and that any desired multiple of such devices can be mounted on a harvester, depending upon the width of the crop area to be handled in one longitudinal pass of the machine.

Taking a single device as shown in FIGURES 5 through 8, the front end of each guide apparatus includes laterally spaced forward wire sections 21 located several inches apart from one another and extending rearwardly from a front transverse brace 20 on the horizontal frame section 12. Immediately rearward of the laterally spaced forward sections 21 are integral converging wire sections 22 which are directed rearwardly and inwardly within a substantially horizontal plane, terminating in elongated adjacent longitudinal wire sections 23. The sections 23 are parallel to the intended direction of travel of the harvester. They in turn terminate in an upwardly directed supporting section 24 anchored at its rear end to a rear brace 25 on the frame section 12.

Taking the wire guide in elevation (FIGURE 6) the forward sections 21 of each wire guide are anchored to the brace 20 at an elevation above the highest elevation of spears to be harvested. The forward sections 21 extend rearwardly and downwardly to an elevation equal to the minimum elevation of asparagus tips to be handled by the harvester. Any tips of insufficient height to reach the elevation of the forward sections 22 will not be engaged by the harvester and will remain undamaged. The converging sections 22 are also located in the same elevational plane as the rear ends of the forward sections 21, so that the wires converge toward one another and lead to the adjacent longitudinal sections 23 at the elevation below which spears are to be uncut. In order for a spear to be directed inwardly between the adjacent longitudinal sections 23 in the manner illustrated in FIGURES 5 through 8, it must be of a height at least equal to the height of the converging wire sections 22 above the supporting ground surface 51.

Adjacent the rear end of the longitudinal sections 23, which extend downwardly to a position adjacent to the ground surface 51, is a cutting wire or loop 26. The loop 26, open to the front of the machine, is of small diameter and cuts each spear 50 located between the longitudinal wire sections 23 during forward movement of the harvester relative to the ground surface 51.

Figure 9:
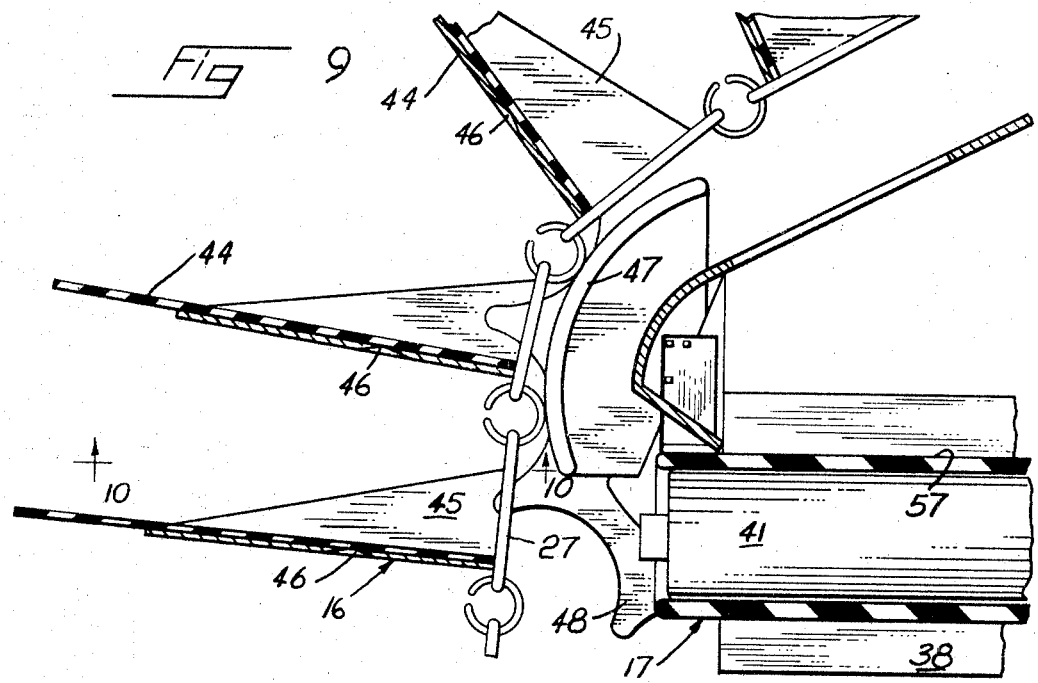
FIGURE 9 is an enlarged fragmentary sectional view of the discharge mechanism for the spear grasping paddles taken through the conveyors along line 9—9 in FIGURE 4.
Figure 10:
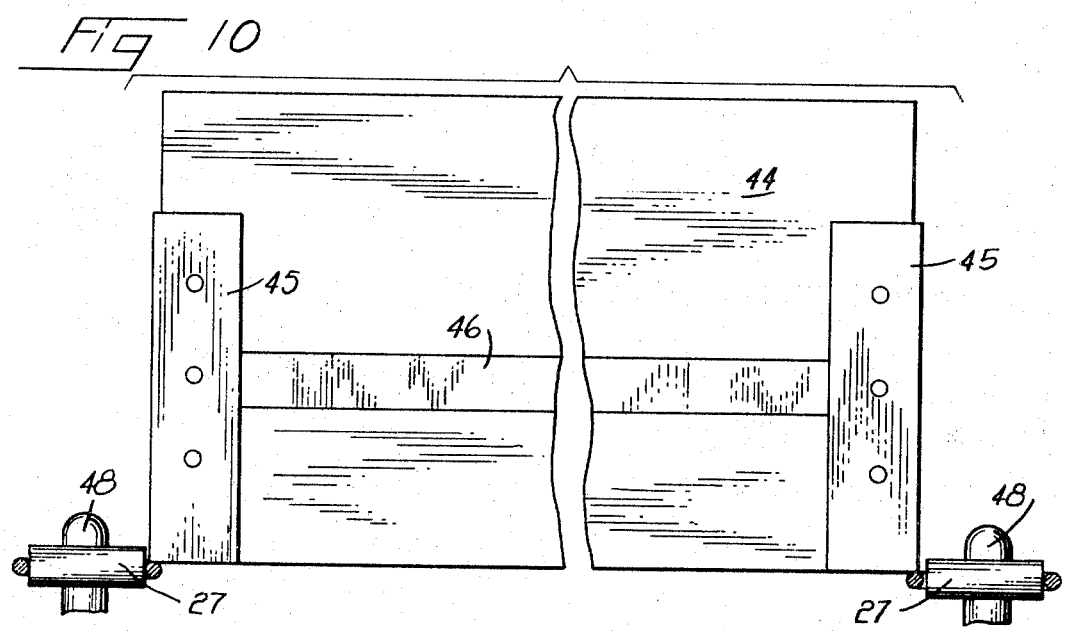
FIGURE 10 is an elevation view taken alongside one conveyor paddle, the center portion of the paddle being broken away.

The asparagus spears 50, particularly the upper tip of each spear, are quite fragile and must be grasped almost simultaneously with the cutting of each spear by the loop 26. This is accomplished by the crop engaging and supporting conveyor assembly 16, which must be understood by a study of FIGURES 2 through 4 and 11. Construction details of the conveyor assembly 16 are shown in FIGURES 9 and 10.

Basically, the conveyor assembly 16 comprises identical endless chains 27 at each side of the harvester. Each chain 27 is wrapped about a front sprocket 28, a rear lower sprocket 30 and an elevated rear sprocket 31. Sprockets 28 are carried by a transverse shaft 32 on frame section 12, the sprockets 28 being fixed to the shaft 32. The elevated sprockets 31 are supported on a transverse shaft 33 adjacent the upper end of the diagonal frame section 13. The rear lower sprockets 30 are rotatably carried on stub shafts mounted on the horizontal frame section 12 so as to leave the intermediate portions of the conveyor unobstructed in this area.

Chains 27 are driven from the front sprockets 28. A driven sprocket 34 at one end of shaft 32 is powered from a drive sprocket 35 on the adjacent wheel axle 19a. Sprockets 34 and 35 are connected by a drive chain 36. Therefore, the speed of sprockets 28 is directly related to the rotational speed of wheels 19.

Extending transversely across the harvester and supported by the endless chains 27 are longitudinally spaced flexible paddles 44. Each paddle 44 is simply a rectangular sheet of suitable plastic or rubber material, mounted by rigid end plates 45. The plates 45, which include triangular end sections that protrude inwardly from the chains 27, support paddles 44 in individual positions substantially perpendicular to the chain length to which they are fixed. Transverse braces 46 extend between the plates 45 to assist in the support of the substantially flexible paddles 44. Braces 46 are tapered along their top and bottom edges to minimize the effect of contact with the fragile crop.

The operation of the conveyor assembly 16 is best understood from FIGURES 3, 6, and 11. The lower flight of each chain 27 extends between the respective front sprocket 28 and rear lower sprocket 30 in a direction substantially parallel to and slightly spaced above the crop guide and cutting apparatus 15. The choice of sprocket size and teeth size for sprocket 28, as well as sprockets 34, and 35, is such that the relative speed between the lower flights of chains 27 and the ground surface 51 is zero. In other words, the lower flights of the chains 27 travel rearwardly at the same rate of speed as the harvester is being towed forwardly relative to the ground surface 51. The only relative movement between chains 27 and the ground surface 51 is the downward movement of chains 27 and paddles 44 due to the inclination of the chains 27 between the front sprockets 28 and the rear lower sprockets 30.

The cutting loops 26 are vertically aligned with the axis of the sprockets 30. Therefore, as each asparagus spear 50 is severed (FIGURE 6) it is gripped along its upper end by the converging paddles 44 as their upper edges move toward one another due to the engagement of chains 27 about the lower periphery of the respective sprockets 30.

Due to the elimination of relative longitudinal movement between chains 27 and the paddles 44 supported thereby and the ground surface 51, the protruding spears 50 cannot be damaged by the paddles 44 as paddles 44 gradually are lowered about spears 50. Also, since the paddles 44 converge about the sprockets 30 adjacent their upper edges, spears too low to be engaged by the forward wire sections 22 will not be cut by loops 26 and will be released from paddles 44 without damage, since 44. The triangular portions of the side plates 45 prevent grip these short spears. However, the spears being cut by the loops 26 will be gently gripped by the yieldable paddles 44 and held in this gripped position as they are turned from a vertical position to a horizontal position resting on an individual paddle 44 at the rear of the sprockets 30.

The chains 27 extend in a vertical direction tangential to the rear edges of sprockets 30. At a suitable elevated location, chains 27 are directed rearwardly again, permitting the release of spears 50 elevated on the paddles 44. The triangular portions of the side plates 45 prevent spears 50 from falling from the transverse ends of the paddles 44 during the elevation thereof.

The change in direction of chains 27 can be accomplished by sprockets on the framework or by arcuate skids contacted in a sliding fashion by chains 27. In the structure illustrated, a combination of these devices is used so as to provide adequate clearance for the accommodation of the delivery conveyor 17, which protrudes to one side of the harvester. Referring to FIGURE 9, the side of the conveyor assembly 16 adjacent to the elevating portion of the delivery conveyor 17 is provided with a fixed skid 47 having the same outside arcuate shape as a coaxial sprocket 48 at the opposite side of the harvester. The combination of sprocket 48 and skid 47 permits chains 27 to be bent so as to change the direction thereof to a flight extending upwardly and rearwardly relative to the supporting frame sections. As seen in FIGURES 3 and 11, this change in angular direction of the chains 27 spreads the individual paddles 44 along their inside edges and inclines each paddle 44 in a forwardly, rearwardly and upwardly directed position so that spears 50 carried thereon will slide or roll in a rearward direction.

Located under the upwardly inclined flight of conveyor assembly 16 is the delivery conveyor 17, basically comprising a laterally directed conveyor 37 supported on the frame section 12 by rotatable rollers 41. The conveyor 37 is provided with transverse cleats 38 to assist in moving the crop supported thereon, particularly along its inclined section at one side of the machine (FIGURE 4). The conveyor 37 is bounded by a forward wall 40 and a rear wall 42, there being an opening directly above the conveyor 37 for reception of the harvested crop as it is released from the paddles 44. The discharge of the conveyor 37 at its upper end is directed into a suitable storage compartment 18, which can be a fixed hopper on the frame section 12, another conveyor having a desired configuration, or a carton support. In any event, the harvested spears are discharged into the storage compartment 18 and are collected therein for further operations.

In FIGURE 11 there is shown one slight modification in the crop guiding and cutting apparatus 15. The rear ends of the adjacent longitudinal sections of wire 23 terminate at the cutting loop 26, which rests directly on the ground surface 51. No rear connections between the wires and the frame are utilized. The desired longitudinal position of the wires is retained by the dragging action accomplished by contact with surface 51. In all other respects, the apparatus will operate in the manner previously described.

With relation to the wire guiding and cutting apparatus, it must be understood that the wires that guide the spears 50 to the cutting wire must be resilient and have sufficient spring tension to return to the initial longitudinal configuration that is desired. As an example of a successfully used material, music wire of .059 inch in diameter has been used for the integral wire sections 21–24, with music wire of .008 inch in diameter being used for the cutting loops 26.

The delivery conveyor 17 can be powered by any suitable apparatus. Generally shown in the drawings is a drive mechanism 43 in the form of a hydraulic motor. It is to be understood that any conventional driving arrangement, whether hydraulic, mechanical, or a combination of mechanisms can be substituted in place of that shown. Also, the conveyor assembly 16 could be driven at a different point along its length, the drive at the front of the machine having been found to be successful since it lessens the tension on chains 27 as they turn about the skid 47 and sprocket 48.

The apparatus described has been successfully used to harvest asparagus spears during longitudinal movement of the harvester relative to the supporting ground surface from which the spears protrude. It minimizes damage to the fragile spear tips while positively gripping and elevating each spear as it is being cut. It does not damage small spears, permitting these to remain for later harvesting or for development into the asparagus fern.

The apparatus shown is basically by way of example. Refinements in the basic concepts will be obvious to one skilled in this field. Furthermore, the configuration of the delivery conveyor 17 is open to many variations, depending upon whether the harvester is to be used to fill cartons or boxes, and depending upon whether the delivery conveyor 17 is to be directed to the side of the harvester or rearwardly therefrom. For this reason, only the following claims are intended to define the scope of the invention.

Having thus described my invention, I claim:

1. A harvester for asparagus and like crops, comprising:
    a ground supported mobile framework;
    means connected to said framework to propel said framework longitudinally along a field;
    crop guide means mounted on said framework at a constant elevation above ground for engaging spears of asparagus having a height greater than a selected minimum;
    crop cutting means on said guide means for severing individual spears engaged by said guide means;
    crop cutting means on said framework for gripping spears simultaneously with the cutting thereof by said crop cutting means and for carrying the spears so gripped to a discharge location relative to said framework;
    and crop receiving means on said framework for collecting spears discharged from said crop conveying means.

2. A harvester as defined in claim 1 wherein said crop guide means comprises:
    a plurality of longitudinal wire elements anchored at their front ends to said framework and extending rearwardly therefrom, the front end of each element having rearwardly extending wires leading from a forwardly open section, said wires converging rearwardly toward one another in pairs within a substantially horizontal plane at an elevation equal to the minimum elevation of asparagus tips to be harvested.

3. A harvester as defined in claim 1 wherein said crop guide means comprises a plurality of bent wire elements fixed to said framework in a transverse row;
    each wire element having two laterally spaced front sections extending rearwardly and downwardly, said front sections converging toward one another within a substantially horizontal plane at an elevation equal to the minimum elevation of asparagus tips to be harvested, each element further having rearwardly protruding adjacent wire sections formed integrally with said front sections and leading downwardly therefrom to ground level.

4. A harvester as defined in claim 1 wherein said crop guide means comprises a plurality of bent wire elements fixed to said framework in a transverse row;
    each wire element having two laterally spaced front sections extending rearwardly and downwardly, said front sections converging toward one another within a substantially horizontal plane at an elevation equal to the minimum elevation of asparagus tips to be harvested, each element further having rearwardly protruding adjacent wire sections formed integrally with said front sections and leading downwardly therefrom to ground level; and
    a looped wire cutting element anchored respectively to the rearward wire sections of each of said elements.

5. A harvester as defined in claim 1 wherein said crop engaging means comprises:
    an endless conveyor movably supported on said framework for longitudinal motion relative thereto;
    said conveyor having rigid slide linkages and a plurality of longitudinally spaced transverse paddles supported thereby, each paddle being flexible;
    said conveyor having a lower flight leading downwardly and rearwardly to a location directly over and adjacent to said crop cutting means.

6. A harvester as defined in claim 1 wherein said crop engaging means comprises:
    an endless conveyor movably supported on said framework for longitudinal motion relative thereto;
    said conveyor including a pair of transversely spaced supporting chains having rigid chain links, and transverse paddles mounted on the individual links in a position directed inwardly perpendicular to the respective links on which they are supported;
    a front pair of sprockets mounted on said framework about a transverse axis forward of and above the elevation of said crop guide means;
    a rear pair of sprockets mounted on said framework about a transverse axis vertically aligned with and above said crop cutting means;
    the lower flight of said conveyor having the chains thereof engaged over the front of said front pair of sprockets and leading rearwardly under the rear pair of sprockets in mesh therewith, the diameters of said sprockets being such that the lower edges of said paddles in the conveyor lower flight extend downwardly and rearwardly to a location upwardly adjacent said crop cutting means.

7. An apparatus as defined in claim 6 further comprising:
    drive means on said framework operatively connected to said conveyor to move the lower flight thereof at a speed equal to the translational speed of said framework relative to the ground surface.

8. An apparatus as defined in claim 6, further comprising:
    chain guide means positioned on said framework above said rear sprockets engaged respectively by said conveyor chains, said chain guide means having front chain supporting edges in vertical tangential alignment with the rear chain supporting edges of said rear pair of sprockets; and
    a third pair of sprockets engaged by said chains, said third pair of sprockets being positioned on said framework rearward of said chain guide means.

9. An apparatus as defined in claim 6, further comprising:
    chain guide means positioned on said framework above said rear sprockets engaged respectively by said conveyor chains, said chain guide means having front chain supporting edges in vertical tangential alignment with the rear chain supporting edges of said rear pair of sprockets; and a third pair of sprockets engaged by said chains, said third pair of sprockets being positioned on said framework rearward of said chain guide means;

said crop receiving means extending across the paddles of said conveyor at a location on said framework rearwardly adjacent to said chain guide means.

References Cited

UNITED STATES PATENTS

| | | | |
|---|---|---|---|
| 1,059,589 | 4/1913 | Bang | 56—229 |
| 2,791,878 | 5/1957 | Kepner | 56—327 |
| 3,066,469 | 12/1962 | Chatagnier | 56—327 |
| 3,176,456 | 4/1965 | Franzen | 56—327 |

RUSSELL R. KINSEY, *Primary Examiner.*